United States Patent
Tillotson (10) Patent No.: US 7,889,122 B2
(45) Date of Patent: *Feb. 15, 2011

(54) REFRACTIVITY RETRIEVAL VIA DIRECT MEASUREMENT OF GNSS BENDING ANGLE

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/557,246

(22) Filed: Sep. 10, 2009

(65) Prior Publication Data

US 2011/0004407 A1    Jan. 6, 2011

Related U.S. Application Data

(63) Continuation of application No. 11/420,531, filed on May 26, 2006, now Pat. No. 7,623,065.

(51) Int. Cl.
H04B 7/185 (2006.01)
G01V 3/12 (2006.01)

(52) U.S. Cl. .............................. 342/352; 702/2; 702/3
(58) Field of Classification Search ................. 342/352; 702/2, 3
See application file for complete search history.

(56) References Cited

U.S. PATENT DOCUMENTS

| 4,093,918 | A | * | 6/1978 | Hitney | 702/2 |
| 5,327,359 | A | * | 7/1994 | Hitney | 702/2 |
| 5,675,081 | A | * | 10/1997 | Solheim et al. | 73/170.28 |
| 6,720,916 | B2 | * | 4/2004 | Christensen et al. | 342/357.05 |
| 7,623,065 | B2 | * | 11/2009 | Tillotson | 342/357.02 |
| 2008/0174487 | A1 | * | 7/2008 | Sokolovskiy et al. | 342/357.12 |

OTHER PUBLICATIONS

Hajj et al, "A Technical Description of Atmospheric Sounding by GPS Occultation," Journal of Atmospheric and Solar-Terrestrial Physics 64, 2002, pp. 451-469.*

Lower-Troposphere Refractivity Bias in GPS Occultation Retrievals, Journal of Geophysical Research, vol. No. pp. 1-12, copyright by the American Geophysical Union, paper No. 0148-0227/02/$9.00, C.O. Ao, T. K. Meehan, G.A. Hajj, A. J. Mannucci and G. Geyerle.

Mountaintop GPS observations: Downward looking GPS occultation measurement on the top of Mt. Fugi, Research Institute for Sustainable Humanosphere, Kyoto University (RISH), Yuichi Aoyama, Y. Shoji, T. Yoshihara, S. Danno and T. Tsuda.

(Continued)

Primary Examiner—Gregory C Issing
(74) Attorney, Agent, or Firm—McNees Wallace & Nurick LLC (57) ABSTRACT

A method and system for taking direct measurements of GNSS signal's arrival angle to remotely measure the atmospheric variables used for weather prediction. More specifically, an improved method and system for obtaining and processing accurate information regarding the weather and other atmospheric changes by measuring the total refractive bending angle of the GNSS signal. For mobile platforms on which receivers are mounted, phased array receivers are used to allow precise measurements of GNSS arrival angles. By measuring the refractive bending angle, more accurate and cost-efficient measurements of atmospheric changes are obtained, thereby resulting in more accurate predictions of the weather.

28 Claims, 11 Drawing Sheets

OTHER PUBLICATIONS

Real-Time Water Vapor Sensing with SuomiNet—Today and Tomorrow, University Corporation for Atmospheric Research, Bulletin of the American Meteorological Society, Oct. 18, 2003, R. Ware, J. Braun, S. Gutman, S.-Y Ha, D. Hunt, H. -H. Kua, C. Rocken, M. Sleziak, T. Van Hove, J. Weber, Y. Xie, R. Athes and A. MacDonald.

Hagr High-gain Advanced GPS Receiver, NAVSYS Corporation, 14960 Woodcarver Road, Colorado Springs, CO 80921.

Bistatic Sensing with Reflected GPS Signals Observed with a Digital Beam-Steered Antenna Array, NAVSYS Corporation, Proceedings of ION GPC 2003, Portland, Oregon, Sep. 2003, Kees Stolk and Alison Brown.

Sensitivity Analysis for Airborne Sounding of the Troposphere by GNSS Radio Occultation, Physics and Chemistry of the Earth, ACRI-ST, Sophia-Antipolis, France and IGAM/University of Graz, Austria, O. Lesne, J. Haase, G. Kirchengast, J. Ramsauer and W. Poetzi.

Satellite Coverage for GPS, Glonass and Galileo in Nordic Waters, Nordic SatNav User Conference, Oslo Nov. 29-30, 2005, Lars Koren Nesheim, Arne Edmund Ofstad.

\* cited by examiner

REFRACTIVITY RETRIEVAL VIA DIRECT MEASUREMENT OF GNSS BENDING ANGLE

CROSS-REFERENCE TO RELATED APPLICATION

This application is a continuation of U.S. patent application Ser. No. 11/420,531 filed May 26, 2006, which is hereby incorporated by reference in its entirety.

BACKGROUND OF THE INVENTION

The present invention relates generally to a method for remotely measuring the atmospheric variables used for weather prediction and more particularly to a method for estimating the refractivity profile of the Earth's atmosphere.

Measurements of satellite systems such as Global Navigation Satellite Systems (GNSS) are generally accurate, however, they operate on frequencies that are sensitive to atmospheric effects. Similar satellite-based navigation systems such as GLONASS and GALILEO are also sensitive to atmospheric effects. To enable the GNSS systems to detect any changes in atmospheric properties or any slight change in refraction of the signals due to natural variations in the atmosphere, sensitive receivers must be used. Currently GNSS systems rely on phase shifting calculations to measure atmospheric properties. To produce weather predictions and forecasts, the GNSS systems measure the excess phase shift induced by the GNSS signals following a refracted path through the atmosphere to a GNSS receiver, rather than the straight path the GNSS signal would follow if there were no change in the atmospheric properties. As the GNSS satellites rise or set, the length of the path that the GNSS signals travel through the atmosphere varies due to refraction. The amount of refraction varies based on how much change there is in the atmospheric properties. Also, as the signal path length and atmosphere refractivity vary, the phase shift of the GNSS signals change as well. Currently, in order to generate refractivity profiles from phase measurements taken along various lines of sight, various algorithms are used with data gathered through phase shifting measurements. Most methods currently measure phase shift directly, which requires advance knowledge of the location of the receiving antenna. When the receiving antenna is carried on a moving platform such as an aircraft, determining the precise location of the antenna makes calculating the phase shift even more difficult.

Another current system for weather prediction measures atmospheric changes using measurements of excess Doppler shift versus time, and then uses these measurements to estimate the phase shift. This method requires less knowledge of the precise location of the antennas and receivers; however, it has yet to be initiated in real-world applications. All of the prior and current solutions for measuring atmospheric refractivity changes to predict weather forecasts are generally characterized by having poor signal-to-noise ratios. Because of the poor signal to noise ratios, the excess phase shift caused by any changes in temperature or humidity approaches the resolution limit for even advanced GNSS receivers. GNSS receivers that are in motion, including the receivers moving on non-ballistic paths, are especially affected by poor signal-to-noise ratios. Even the Doppler shift versus time approach has a similar problem with the poor signal-to-noise ratio. The excess Doppler shift due to temperature or humidity variations in the atmosphere is close to the frequency resolution limit for receivers on mobile platforms.

Another deficiency with the current systems is that they operate as if the atmosphere is horizontally homogeneous. While incorrect, this assumption is required for the refractivity profile algorithms used in these systems. While the assumption of a horizontally homogeneous atmosphere is the best solution for this system, it leads to errors in refractivity estimates and degrades the horizontal resolution of occultation measurements, thereby creating errors in weather prediction based on these methods.

Thus, there is a need for a method and system to accurately measure refraction of GNSS signals caused by changes in the Earth's atmosphere. With such a system, more accurate GNSS measurements can be recorded, and further, more accurate weather predictions will result.

SUMMARY OF INVENTION

The present invention is directed to a method of determining refractivity properties of the Earth's atmosphere using Global Navigation Satellite System (GNSS) signals. The method includes the steps of providing a plurality of antenna elements configured to measure the arrival angle of a GNSS signal, mounted on a platform and separated by a predetermined vertical distance, and one receiver device, which is connected to each of the antenna elements; receiving the GNSS signal at each of the plurality of antenna elements; measuring an arrival angle by measuring a phase of the GNSS signal for each of the plurality of antenna elements; determining a difference between the nominal arrival angle of the GNSS signal and the measured arrival angle of the GNSS signal; calculating a refractive bending angle between measured and nominal GNSS arrival angles; and transforming the refractive bending angle of the GNSS signal into profiles of physical properties of the atmosphere.

Another aspect of the invention is directed to a method of determining refractivity properties of the Earth's atmosphere using Global Navigation Satellite System (GNSS) signals. The method includes the steps of providing a plurality of antenna elements configured to measure an actual arrival angle and actual arrival phase of a GNSS signal, mounted on a platform and separated by a predetermined vertical distance, and one receiver device, which is coupled to each of the plurality of antenna elements and configured to calculate a nominal arrival angle and a nominal arrival phase of the GNSS signal based on data transmitted from a source of the GNSS signal. The method also includes receiving the GNSS signal at each of the plurality of antenna elements, measuring an actual arrival angle of the GNSS signal and measuring an actual arrival phase of the GNSS signal for each antenna element of the plurality of antenna elements. In addition, the method determines a difference between the nominal arrival angle of the GNSS signal and the actual arrival angle of GNSS signal, determines a difference between the nominal arrival phase of the GNSS signal and the actual arrival phase of GNSS signal and calculates a refractive bending angle and an absolute phase shift of the GNSS signal based on the determined differences between the actual and nominal arrival angles of the GNSS signal and the actual and nominal arrival phases of the GNSS signal. Lastly, the method involves generating a profile of physical properties of the atmosphere based on a transformation of the refractive bending angle of the GNSS signal and the absolute phase shift of the GNSS signal.

In yet another aspect of the present invention, there is a system for determining refractivity properties of the Earth's atmosphere using Global Navigation Satellite System (GNSS) signals. The system includes a plurality of antenna elements configured to measure the arrival angle of a GNSS signal, mounted on a platform and separated by a predetermined vertical distance and a receiver unit coupled to each of the plurality of antenna elements. The receiver unit is configured to receive the GNSS signal detected by each of the plurality of antenna elements, measure an actual arrival phase of the GNSS signal for each antenna element and compute an actual arrival angle from the arrival phase. In addition, the receiver unit is configured to determine a difference between the nominal arrival angle of the GNSS signal and the actual arrival angle of GNSS signal, determine a difference between the nominal arrival phase of the GNSS signal and the actual arrival phase of GNSS signal, calculate a refractive bending angle and an absolute phase shift of the GNSS signal based on the determined differences between the actual and nominal arrival angles of the GNSS signal and the actual and nominal arrival phases of the GNSS signal and lastly, generate a profile of physical properties of the atmosphere based on a transformation of the refractive bending angle of the GNSS signal and the absolute phase shift of the GNSS signal.

Rather than inferring the bending angles from the total phase shift of the signals as in the current systems, the present invention directly measures the total angle of refraction of the signal. The direct measurement of the total angle of refraction at the receiver results in a more accurate measurement of the changes in atmospheric properties used in weather prediction models.

Errors in the relative phase between two nearby antenna elements are largely independent of errors in absolute phase for the pair of antenna elements. Statistical measurements with independent errors can be combined to reduce the overall error, therefore, improved noise reduction and precision in the GNSS signal detection process occurs when the direct measurement of the angle of refraction of the signal is combined with ordinary GNSS signal phase shift occultation.

One advantage of the present invention is that a more direct measurement of refractive bending of GNSS signals in the Earth's atmosphere is obtained.

Another advantage of the present invention is the improvement of noise reduction and precision in the GNSS signal detection.

Yet another advantage of the present invention is the reduction in the total error of the refractivity profile.

Another advantage of the present invention is the mitigation of ambiguity in other factors such as location, size, and the refractivity of atmospheric features affecting the incoming signals to the receivers. The potential errors for these factors are corrected in the present invention by using measurements of the refractive bending angle combined with measurements of absolute phase angle of the signal.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Many modern aircraft use radio-positioning signals broadcast from satellites (e.g. GPS, GLONASS, GALILEO) for navigation. It is to be understood that while the term GNSS is used throughout the detailed description of the invention, any one of the available satellite systems may be used with the present invention. While any one signal only conveys information regarding the changes in atmospheric properties along its own path, the large number of GNSS receivers and satellites currently in use provide a plethora of measurements of atmospheric properties along the numerous paths between these devices. By collecting data and information from all of these signals, more accurate weather prediction forecasts and models can be produced.

It has been shown that the index of refraction is related to the properties of air as follows:

$$(n-1) \times 10^6 = a_1 P/T + a_2 P_w/T^2 \qquad \text{Equation 1}$$

where:
n=index of refraction
T=Air Temperature
P=Air Pressure
$P_w$=Water Vapor Pressure
$a_1$=77.6 K mbar$^{-1}$
$a_2$=3.73×10$^5$ K2 mbar$^{-1}$ Ao, C. O. et al., *Lower-Troposphere Refractivity Bias in GPS Occultation Retrievals*, Journal of Geophysical Research, 108 (D18), Pages 1-12.

As a result, the air refracts electromagnetic waves as the waves pass through it. The amount of refraction occurring along a wave's (or signal's) path therefore changes as the path changes. The changing amount of refraction causes several measurable alterations to the signal. More particularly, these alterations include changes in the phase, the intensity, and the frequency of the wave induced by changes to the path that the signal travels.

Figure 1:
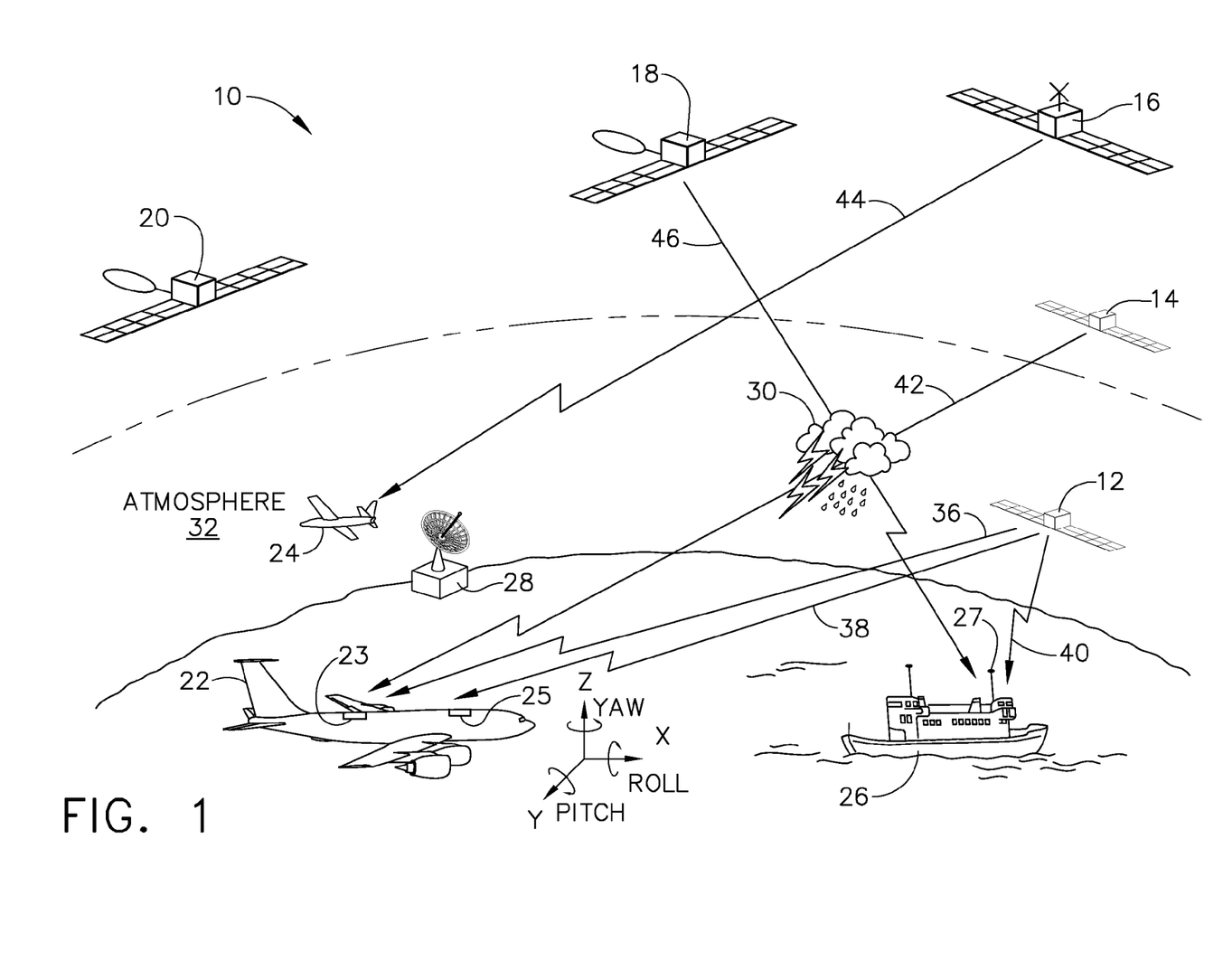
FIG. 1 illustrates a global system for the detection of clear air atmospheric changes in accordance with the principles of the present invention.

The exemplary system 10 shown in FIG. 1 includes a constellation of satellites 12, 14, 16, 18 and 20, a plurality of mobile platforms 22, 24 and 26, and a ground station 28 distributed in such a manner as to detect the changes in atmospheric properties 30 that might occur. While the change in atmospheric properties 30 is shown as a cumulonimbus cloud (i.e., a thunderstorm) it will be understood that the principles of the present invention apply equally to any changes in atmospheric properties that may occur, including atmospheric changes that bear no visible indication.

The satellites 12, 14, 16, 18 and 20 may be any satellite that transmits signals in the form of electromagnetic energy (e.g., radio frequency energy) generally towards the Earth or any other celestial body having an atmosphere. Preferably, the satellites are components of a constellation of satellites such as a system for providing global positioning services (e.g., GPS, GLONASS, or GALILEO systems), a system for providing telecommunications (e.g., Iridium, Globalstart, Intermediate Circuilar Orbit, Orbcomm, or Teledesic systems), or even a collection of unrelated satellites. Likewise, the particular mobile platforms 22, 24 and 26 used are not critical. But exemplary mobile platforms include aircraft 22 and 24 and ships 26 as well as other air, space, marine, and land vehicles. Preferably, each satellite 12, 14, 16, 18 and 20 carries a transmitter to broadcast signals for receipt by receivers at the terrestrial portions 22, 24, 26 and 28 of the system 10 although the location of the receivers and transmitters can be reversed or interchanged without departing from the scope of the present invention.

The transmission of the signals between the transmitters and receivers is illustrated by a variety of signal paths in FIG. 1. For instance, satellite 12 is shown transmitting two signals received by the aircraft 22 and one signal received by the ship 26 via, respective paths 36, 38 and path 40. Satellite 14 is also shown transmitting to the aircraft 22 via path 42. Likewise, satellite 16 is transmitting to the aircraft 24 via path 44 and satellite 18 is transmitting to the ship 26 via path 46. As is apparent from FIG. 1, each of the receiving portions and transmitting portions respectively of the system 10 can receive or transmit a single signal or multiple signals.

The majority of these paths 36, 38, 40, 42, 44 and 46 will pass through the atmosphere 32 while being altered by conditions in the atmosphere. These alterations will typically include phase shifts, frequency shifts, and intensity changes in the signal as it is received at the terrestrial portions 22, 24, 26 and 28 of the system 10. Also worth noting is that many portions of the system 10 move. Thus, the paths 36, 38, 40, 42, 44 and 46 will sweep through the atmosphere forming curvilinear three-dimensional surfaces along which the signals travel during the time that any pair of transmitters and receivers are visible to one and another. As the mobile components of the system 10 move, the paths will encounter varying degrees of atmospheric properties 30. For example, paths 36, 38, 40 and 24 are shown traversing relatively dry or clear portions of the atmosphere while paths 42 and 46 are both shown penetrating the volume of moist air 30 albeit at different locations and angles. Thus, changes in atmospheric properties 30 can alter the signals traveling on the paths 42 and 46 to a greater extent than the atmosphere alters the signals traveling on the other paths 36, 38, 40, and 44.

Figure 2:
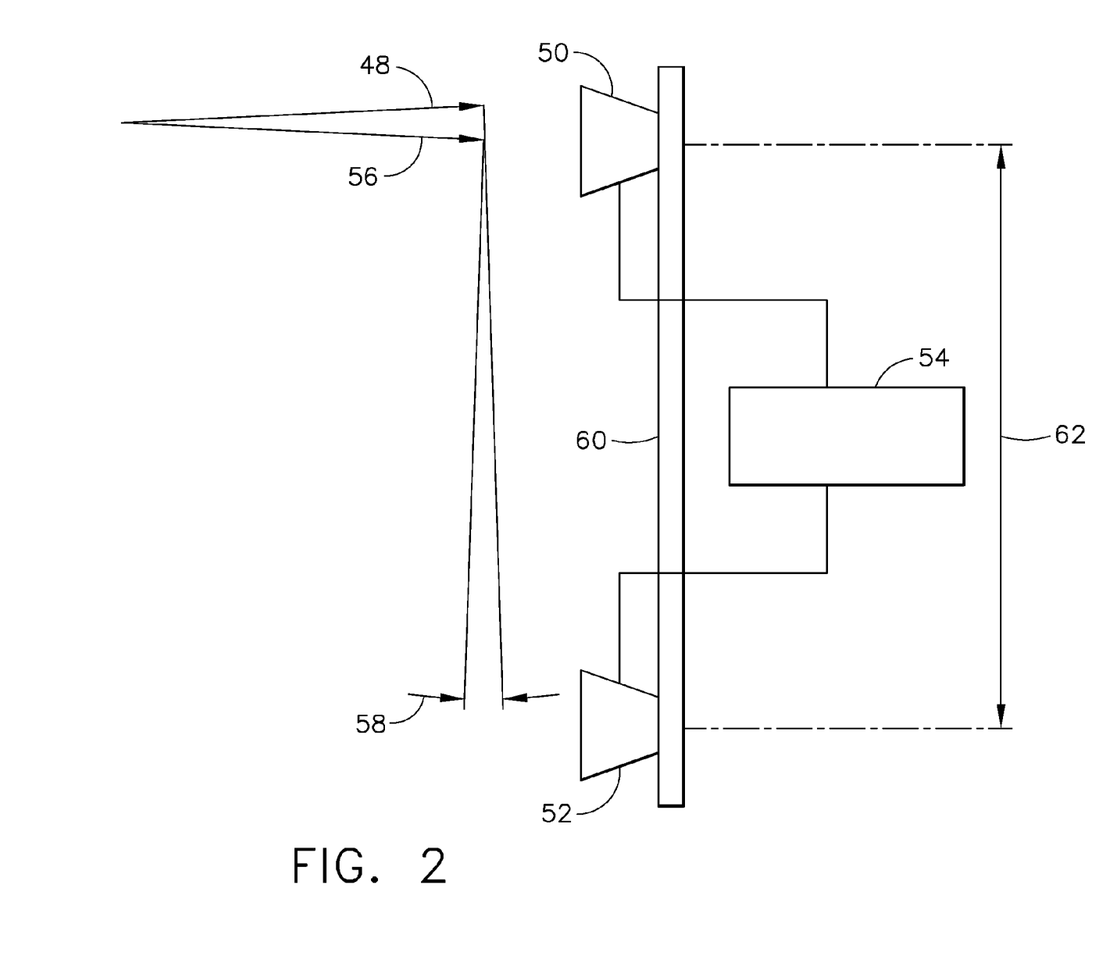
FIG. 2 illustrates the preferred embodiment of the vertical phased array GNSS antenna elements.

Referring to FIG. 2, the present invention uses measurements of the nominal arrival angle 48 of the GNSS signal to determine the total refraction of the GNSS signal due to the atmospheric conditions. The nominal arrival angle 48 ($\alpha_0$) is the elevation angle of a straight line from a GNSS satellite 12, 14, 16, 18, 20 arriving at a terrestrial portion 22, 24, 26, 28 of the system. The nominal arrival angle 48 is computed from known positions of the satellites 14 and the antenna elements 50, 52. The satellite positions are calculated from information encoded in the GNSS signal. For non-GNSS satellites, the position is calculated from published ephemerises. The antenna element positions are found in any one of several ways, one way being using GNSS information from multiple satellites. The calculation of the nominal arrival angle 48 and the direct measurement of the actual arrival angle 56 reveals the total refractive bending caused by the path of the signal through the atmosphere and any atmospheric properties 30 that the GNSS signal may encounter along the path. To enable the direct measurement of the refractive bending angle, phased array receivers 54 are used to obtain precise measurements of the GNSS arrival angles. The absolute arrival angle is the angle relative to geographically fixed coordinates, e.g. earth-centered coordinates. Both the actual arrival angle 56 ($\alpha_1$) and the nominal arrival angle 48 can be measured as an absolute angle. The absolute arrival angle is obtained by measuring the absolute orientation of the antenna, and then adding the arrival angle relative to the antenna axes. Subtracting the absolute arrival angle from the absolute nominal arrival angle will result in a measurement for one type of relative arrival angle. An alternative arrival angle is the angle of the signal relative to the axes of the antenna.

The present invention uses a vertical phased array of two or more GNSS antenna elements 50, 52. The use of two antenna elements 50, 52 provides for more accurate measurements of the refractive angle of the signals. Vertical separation between the antenna elements 50, 52 must be great enough to allow the angle measurements to detect a 1% variation in total GNSS refracting angle at the surface of the Earth. The typical total refractive angle for the atmosphere of the Earth is about 1.42 degrees, which is the same regardless of the GNSS system used. Therefore, the actual arrival angle 56 must be measured within 0.014 degrees, or $2.49 \times 10^{-4}$ radian of the actual value of the arrival angle. The actual arrival angle 56 is calculated from the refractive bending angle 58 between the two antenna elements 50, 52 on the vertical surface 60, or platform. GNSS phase difference between two antennas 50, 52 can be measured to better than 0.01 wavelength, i.e. about 2 millimeters. In order to obtain the required angular precision, the antenna elements 50, 52 must have a vertical separation 62 ($\Delta_Z$) that is typical for the atmosphere of the Earth. The vertical separation 62 is dependent upon the wavelength of the signal, where the wavelength varies with each satellite used. The value for vertical separation used for the present invention is calculated for a GPS GNSS satellite system, since GPS is used by a vast majority of all aircraft. The required vertical separation 62 must be at least as large as the value calculated by:

$$\Delta_Z = \Delta_\phi / \Delta_\alpha, \qquad \text{Equation 2}$$

where:
$\Delta_\phi$=the phase difference in the phases of the nominal arrival angle $\alpha_0$ and the actual arrival angle $\alpha_1$
$\Delta_\alpha$=the difference between the nominal arrival angle $\alpha_0$ and the actual arrival angle $\alpha_1$
$\Delta_Z = 2 \times 10^{-3}$ meters/$2.49 \times 10^{-4}$ radian
$\Delta_Z = 8.03$ meters While the platform 60 is shown as a planar or linear surface in FIG. 2, it should be noted that this is a schematic illustration, and that the vertical separation 62, of 8.03 meters can be achieved on vertical mobile surfaces 60 or platforms, e.g. ships, buildings, or large transport airplanes. For platforms 26 that are stationary, e.g. buildings, or that have less movement than mobile platforms 22, the vertical separation 62 is simple to achieve due to their wide girth and large surface area. On highly mobile platforms 22, e.g. airplanes, the vertical separation 62 between the antenna elements 50, 52 maybe achieved by affixing one antenna 52 on the fuselage and one antenna 50 on the top of the vertical tail on a typical airliner, or even from locations on the upper and lower fuselage for larger, wider bodied airliners.

In an alternate embodiment, the present invention may be implemented by having at least one high-gain steerable dish antenna element in the phased array GNSS unit antenna elements. This alternate arrangement may be preferable in situations where the high-gain steerable dish antenna elements are already installed and available, thereby avoiding the cost of installation of phased array GNSS antenna elements and receivers.

The present invention is used to make the physical measurements of any changes in atmospheric properties to enable reliable predictions of the weather and to produce more accurate weather forecasts. When the equipment shown in FIG. 2 is mounted on mobile platforms 22, e.g. airplanes, the invention may include inertial measurement units (IMUs) or other means to estimate relative motion of the various GNSS antenna elements (e.g. star tracker, horizon tracker, or a DGPS using high-elevation satellites). The use of IMUs assists in reducing error in angle measurements by subtracting the relative phase shifts due to structural motion from the measured phase shifts. The remaining phase shifts after subtracting relative phase shifts due to structural motion are due to the arrival angle. The use of an IMU allows the invention to compensate for motion and rotation of the vehicle. The use of multiple IMUs, preferably one near each antenna element 50, 52, allows the invention to compensate for any flexing of the structure.

Ambiguity can occur when dealing with horizontal homogeneity. For simplicity, only GNSS signal 44 (FIG. 1) will be used for the following explanation, with the understanding that any of the GNSS signals can be used. The Earth's atmosphere is not horizontally uniform, although many measurements and calculations assume a horizontally uniform atmosphere. Because of the assumption, a homogeneous model introduces error by forcing a refractivity profile to calculate accurate results with an inaccurate factor. Therefore, to reduce this error, measurements of the refractive angle of the phased array GNSS signal 44 are combined with measurements of absolute phase of the phased array GNSS signal 44 for more accurate measurements with no assumption of horizontal homogeneity. The combination of the refractive angle and the absolute phase of the GNSS signal 44 results in a reduction of the ambiguity of elements such as location, size, and refractivity of atmospheric features, e.g. reportable weather-related changes in atmosphere properties.

Figure 3:
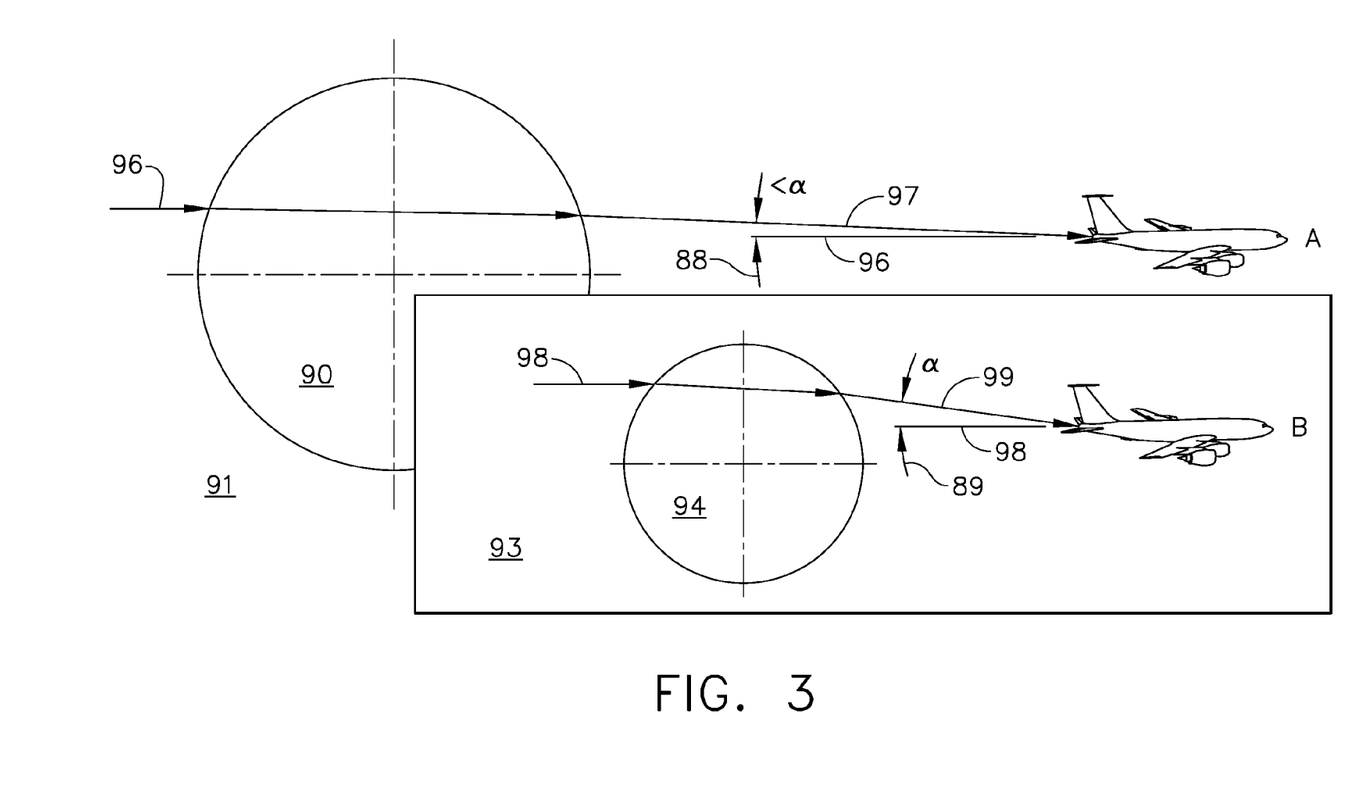
FIG. 3 illustrates the directional angled paths of the GNSS signal refractivity.

Referring to FIG. 3, a comparison of two GNSS signal paths 96, 98 illustrates how ambiguity due to vertical non-homogeneity can affect the absolute phase angle of the GNSS signal 44. The GNSS signal 44 traverses convex regions having high refractivity values $N_0$ and $N_1$, i.e., the regions are non-homogeneous. In the example of FIG. 3, GNSS path traverses a first region 91 characterized by a first refractivity value $N_0$, and through a second region 90 characterized by a second refractivity value, $N_1$, to reach aircraft A as GNSS signal path 97. The second region 90 is large, but distant from aircraft A. In the case of aircraft B, however, the GNSS path 44 similarly traverses regions 93 and 94. Regions 93 and 94 have different refractivity values. Region 94 is smaller than region 90, and has a refractivity value of $2N_1$, or twice the refractivity value of region 90. Also, region 94 is nearer to aircraft B than region 90 is to aircraft A. Refraction of GNSS signal path 94 results in GNSS signal path 99 at aircraft B. In this example, the actual arrival angle 89 of the GNSS signal path at aircraft B is greater than the actual arrival angle 88 of the GNSS signal path 96 at aircraft A, but the GNSS signal path 97 and 99 arrive with the same absolute phase at both aircraft A and aircraft B, respectively.

Figure 4:
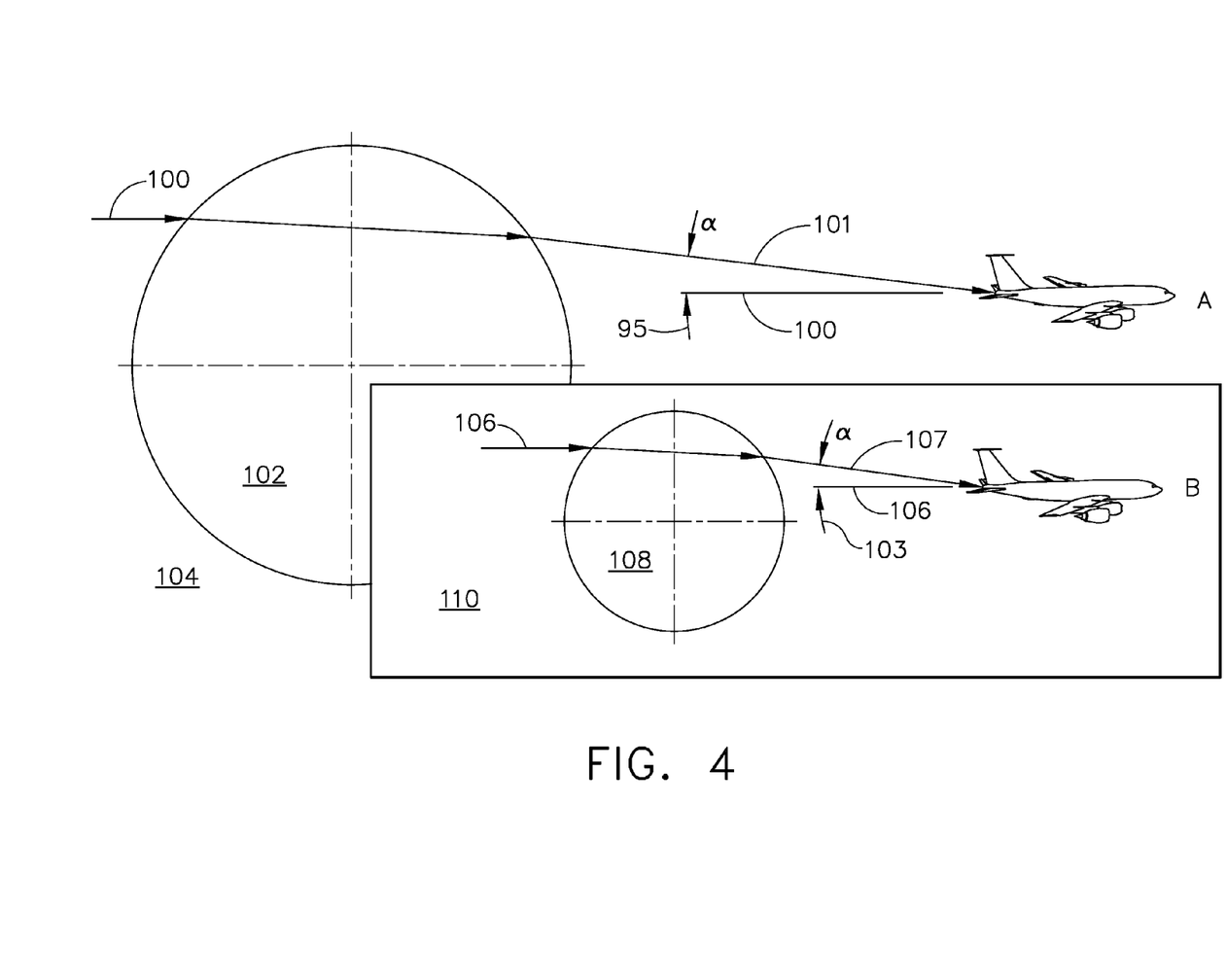
FIG. 4 illustrates the directional angled paths of the GNSS signal refractivity in terms of the receiver's distance from the transmitter.

Another example of ambiguity due to vertical non-homogeneity is illustrated in FIG. 4. In FIG. 4, the GNSS path 100 traverses a first convex region 102 characterized by a first refractivity value, $N_1$, and through a second convex region 104 characterized by high refractivity value, $N_0$, wherein $N_1 > N_0$. Region 108 is smaller than region 102, but nearer to aircraft B than region 102 is to aircraft A. Refraction of GNSS signal paths 100 and 106 result in GNSS signal path 101 and 107. Thus, as shown in the drawing, the arrival angles 95 and 103 of the GNSS signal paths 101 and 107 are identical. Although the refractivity of the regions differ, the distance from the region the signal must travel to the aircraft is also different. The absolute phase delay of the GNSS signal path 101 at aircraft A is greater than the absolute phase delay of the GNSS signal path 107 at aircraft B because of the longer distance the signal must travel to reach the aircraft. While these figures show simple illustrations of the more complex, actual atmospheric principles, the combined measurement of phase and angle is helpful in reducing vertical ambiguity, and results in greater weather prediction accuracy.

More than one computational method is known for transforming the measurements of the arrival angle of the signal and the measurements of the absolute phase angle of the signal into estimated atmospheric profiles. One method that is generally considered the most versatile and most accepted in the meteorology community is based on variational analysis. In this method, commonly referred to as 3Dvar, a vector x, contains values of atmospheric properties to be estimated. The vector x may include values pertaining to variables such as temperature or humidity at various latitude/longitude/altitude locations in the Earth's atmosphere. The values in vector x are varied to minimize a cost function given by Equation 3, as follows:

$$J(x) = \tfrac{1}{2}(x-x_b)^T B^{-1}(x-x_b) + \tfrac{1}{2}(Hx-y_0)^T R^{-1}(Hx-y_0) \qquad \text{Equation 3}$$

where:
    x=Vector of atmospheric properties to be estimated
    J(x)=Cost function to be minimized
    T=Matrix transposition operator
    $x_b$=prior estimate of x based on other models
    B=Matrix of weights based on confidence in and covariance of various values in $x_b$
    H=Forward model that transforms a given vector of atmospheric properties into a vector of quantities actually observed
    R=Matrix of weights based on confidence in and covariance of various values of Hx and $y_0$
    $y_0$=Vector of observations including one or more measurements of refractive bending angles and one or more measurements of absolute phase.

It should be noted that the forward model H used in each case depends on the trajectories of the airplane and of the GNSS satellite used for the occultation measurements. In addition, the same equation can be utilized to transform the actual arrival angle of the GNSS signal into profiles of physical properties of the atmosphere, where the variables represent slightly different elements as follows:

$$J(x) = \tfrac{1}{2}(x-x_b)^T B^{-1}(x-x_b) + \tfrac{1}{2}(Hx-y_0)^T R^{-1}(Hx-y_0) \qquad \text{Equation 3B}$$

where:
    x=Vector of atmospheric properties to be estimated
    J(x)=Cost function to be minimized
    T=Matrix transposition operator
    $x_b$=prior estimate of x based on other models
    B=Matrix of weights based on confidence in and covariance of various values in $x_b$
    H=Forward model that transforms a given vector of atmospheric properties into a vector of quantities actually observed
    R=Matrix of weights based on confidence in and covariance of various values of Hx and $y_0$
    $y_0$=Vector of observations including one or more measurements of refractive bending angle The present invention includes the use of phased-array antennas capable of receiving GNSS frequencies, which are well known in the art. One commonly known phased-array antenna is a mobile phased array GNSS receiver manufactured by the NAVSYS Corporation of Colorado Springs, Colo., also referred to as the High-gain Advanced GNSS Receiver (HAGR). The HAGR allows antenna elements to be placed at arbitrary locations within reach of a coaxial cable. The HAGR apparatus may be used to practice the present invention, to accept inputs from antenna elements located on an airplane fuselage and at the top of a vertical tail of the airplane. The HAGR apparatus receives both the L1 and L2 bands of GNSS signals, which are necessary to measure as well as subtract the refractive effects of the Earth's ionosphere on the GNSS signals. The HAGR apparatus also provides pitch, roll, and yaw compensation so the proper phase shift is maintained among the various antenna elements. The pitch, roll, and yaw compensation assumes that the antenna elements are mounted on a truly rigid structure with no flexibility. With respect to Equation 3, additional measurements are needed when structural bending can exceed a large fraction of a millimeter.

Figure 5A:
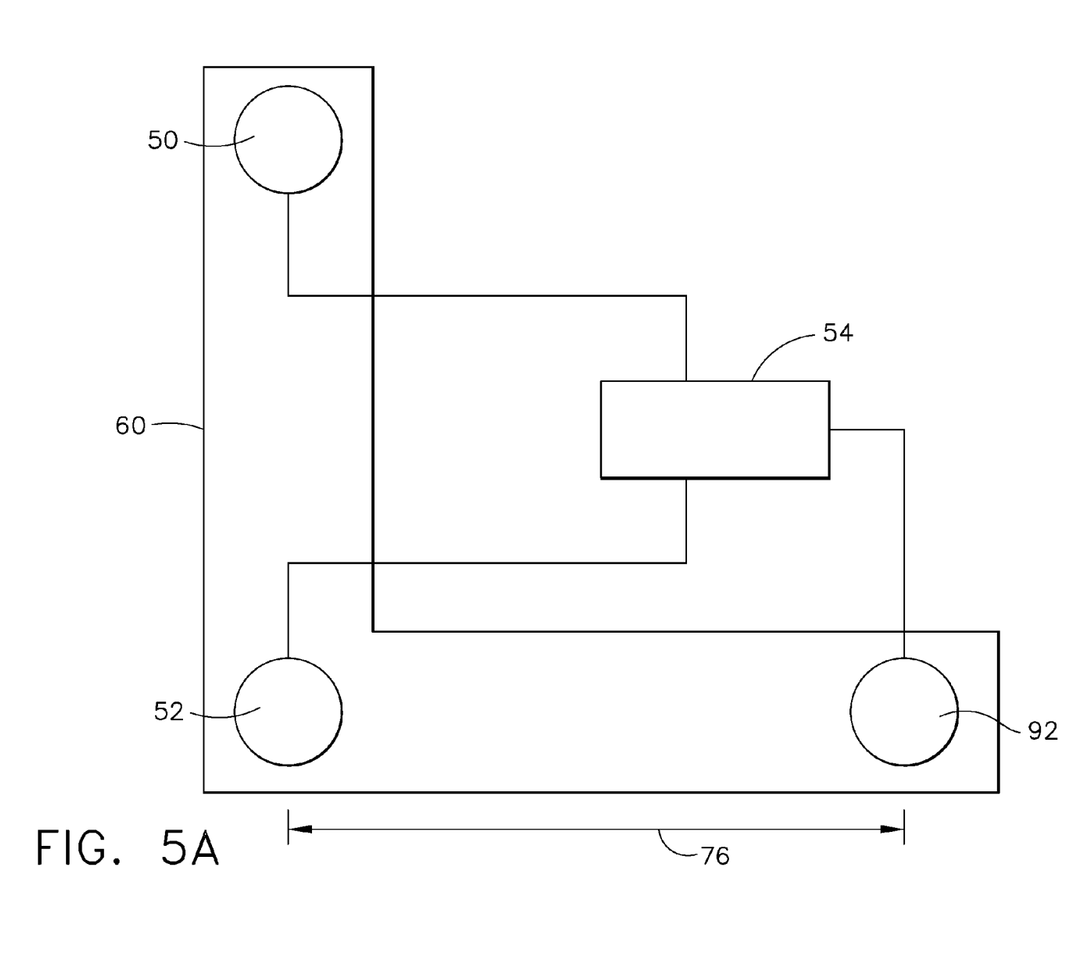
FIG. 5A illustrates an alternate embodiment of the invention including a third antenna element from the top view.
Figure 5B:
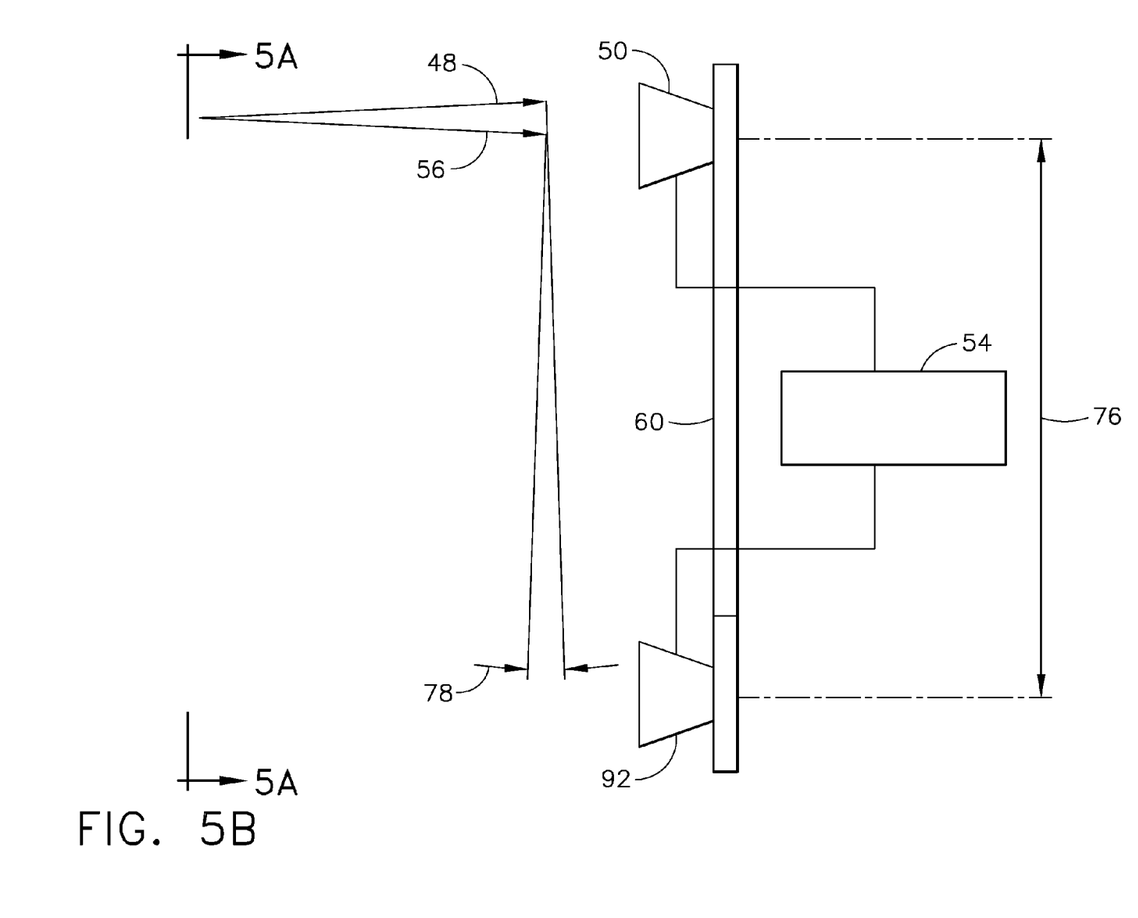
FIG. 5B illustrates an alternate embodiment of the invention including a third antenna element from the side view.

Referring now to FIGS. 5A and 5B, another embodiment of the present invention is shown. FIG. 5A is a front view of the system with a third antenna element 92 added to the two-antenna element configuration shown in FIG. 2. The third antenna element 92 is horizontally offset from the other antenna elements 50 and 52. The third antenna element 92 is connected to the same phased array receiver 54 as antenna elements 50 and 52 for processing received signals. The phased array receiver 54 uses relative phase measurement from the third antenna element 92 to measure the horizontal arrival angle of the GNSS signal as discussed in greater detail below with respect to FIG. 9. The horizontal distance from the antenna elements 50, 52 to the third antenna element 92 determine the precision with which the horizontal arrival angle is measured. FIG. 5B illustrates the front view of the system with a third antenna element 92 added. FIG. 5B better illustrates the effect of the horizontal distance 76 from the antenna elements 50, 52 to the third antenna element 92 on the horizontal arrival angle of the signal 48. FIG. 5B illustrates the top view of the system, where the antenna element 52 is not readily visible because it is behind antenna element 50. The phase distance 78 is greater in proportion to the horizontal distance 76.

Figure 5C:
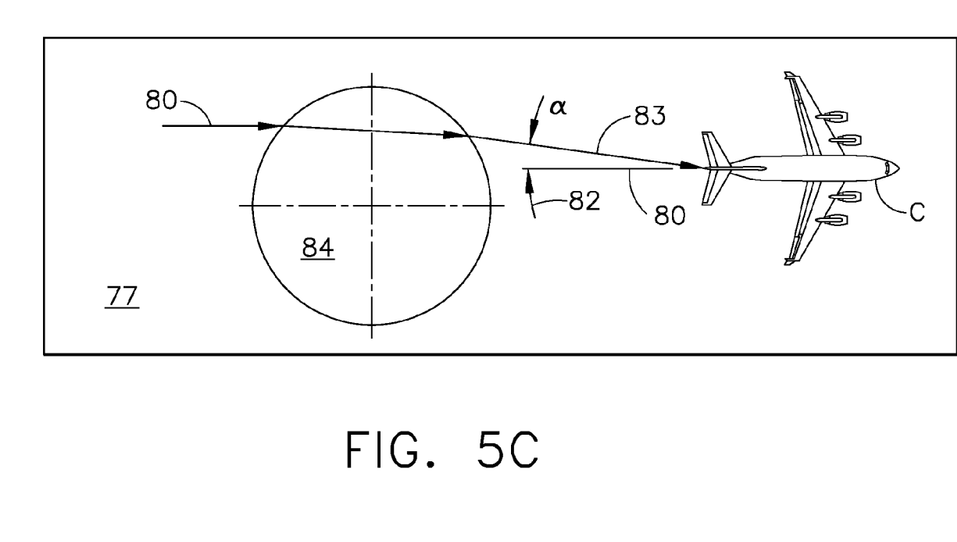
FIG. 5C illustrates the directional angled paths of the GNSS signal affected by a horizontal refractivity gradient.

Referring now to FIG. 5C, two GNSS signal paths arriving at a mobile platform are compared. A large atmospheric region 84 with refractivity properties causes horizontal bending of the GNSS signal transmitted from a satellite to a mobile platform. In case of aircraft C, however, the GNSS path 44 similarly traverses regions 77 and 84. Regions 77 and 84 have different refractivity values. Refraction of GNSS signal path 80 results in GNSS signal path 83 at aircraft C with actual arrival angle 82. The nominal horizontal arrival angle 80 corresponds to a straight path from satellite to aircraft C, while the actual horizontal arrival angle 82 depends on the location and shape of the region 84 and on its refractivity properties.

Figure 6:
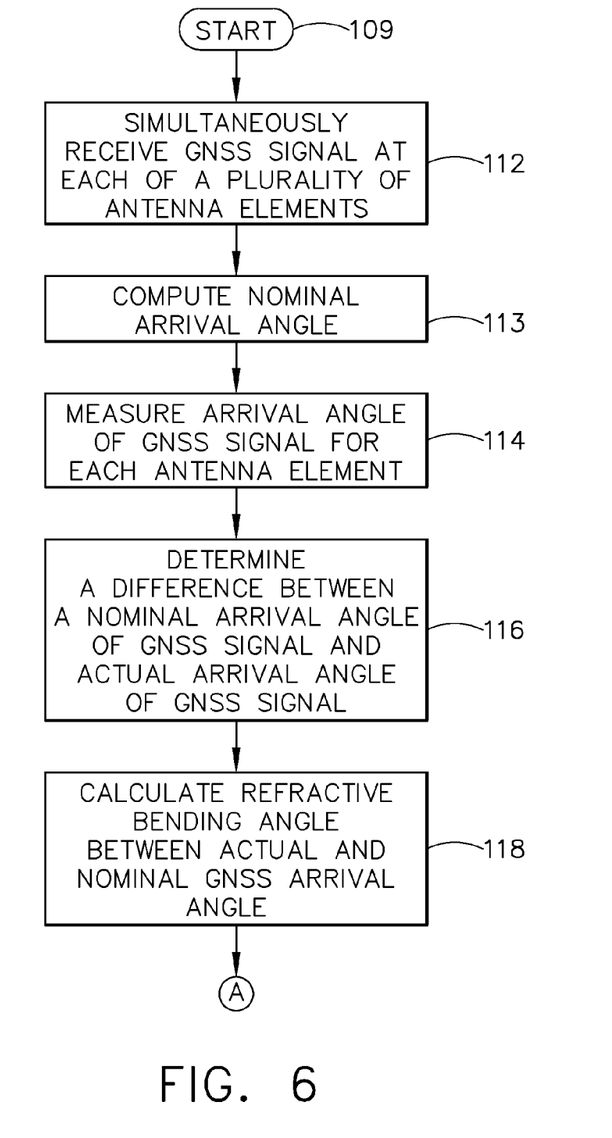
FIGS. 6, 8 and 9 are flow diagrams of the method of the present invention.

Referring next to FIG. 6, an exemplary method of the present invention is set forth. As discussed above and shown in FIG. 2, a plurality of antenna elements 50, 52 and receivers 54 are provided to implement the present method. The system is started at Step 109. At Step 112, the system simultaneously receives a GNSS signal at each of a plurality of the antenna elements 50, 52, after the signal passes through the atmosphere. The antenna elements 50, 52 are configured to measure the arrival angle of the signal, from which the receiver 54 determines a nominal arrival angle 48 of the GNSS signal from the incoming GNSS signal as shown in FIG. 2. The nominal arrival angle is computed from known positions of the satellites 14 as shown in FIG. 1, and the antenna elements 50, 52. The satellite positions are calculated from information encoded in the GNSS signal. For non-GNSS satellites, the position is calculated from published ephemerises. The antenna element positions are found in any one of several ways. One way may be using GNSS information from multiple satellites. The actual arrival angle 56 reveals the total refractive bending caused by the path of the signal through the atmosphere and any atmospheric properties 30 shown in FIG. 1 that the GNSS signal may encounter along the path. Next, at Step 113, the nominal arrival angle is computed, and at Step 114, the arrival angle of the GNSS signal is measured. The receiver measures a relative arrival angle (relative to the antenna). This relative arrival angle is transformed into an absolute angle by adding the orientation of the antenna relative to the geographically fixed coordinate system. After measuring the arrival angle of the GNSS signal, the system determines the difference between the nominal arrival angle 48 of the GNSS signal and the actual arrival angle 56 shown in FIG. 2 of GNSS signal at Step 116. Finally, the refractive bending angle between actual and nominal GNSS arrival angle is calculated at Step 118. The relative signal offset for the platform is then determined in step 120.

Figure 7:
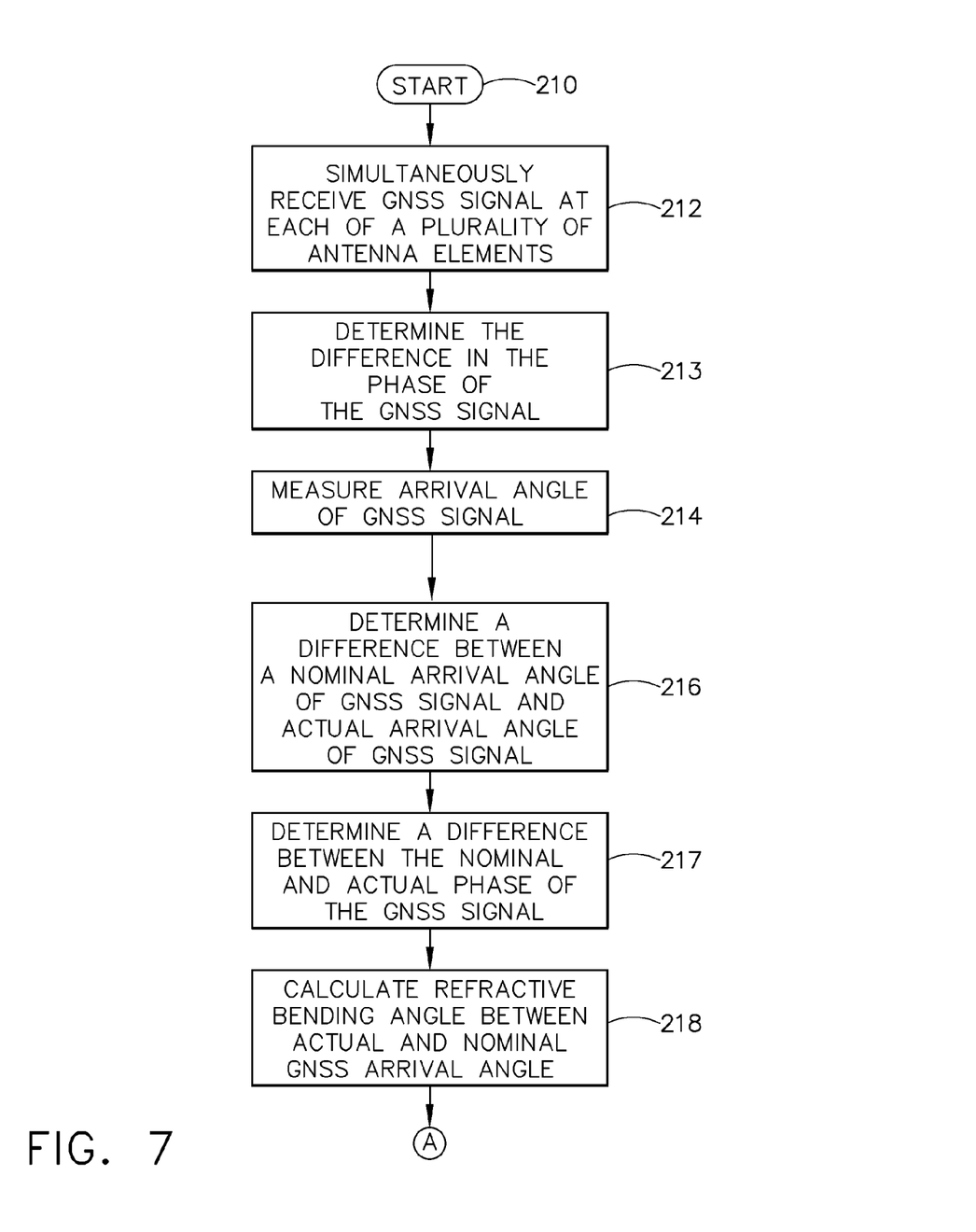
FIG. 7 is a flow diagram of an alternative embodiment of a method of the present invention.

Referring next to FIG. 7, an alternate embodiment of the present invention is set forth. As discussed above, a plurality of antenna elements 50, 52 and receiver 54 shown in FIG. 2 are provided to implement the present method. The system is started at Step 210. At Step 212, the system simultaneously receives a GNSS signal at each of a plurality of the antenna elements 50, 52, after the signal passes through the atmosphere. The antenna elements 50, 52 and receiver 54 are configured to measure the phases of the signal, and to determine a nominal arrival angle 48, shown in FIG. 2, of the GNSS signal from the incoming GNSS signal. Next, at step 213, the difference between the phases of the GNSS signal for each antenna element is determined. At Step 214, the arrival angle of the GNSS signal is measured. After measuring the arrival angle and phase of the GNSS signal, the system determines the difference between the nominal arrival angle 48 of the GNSS signal and the actual arrival angle 56 of GNSS signal and between the nominal arrival phase and the actual arrival phase of GNSS signal at Step 216. Finally, the refractive bending angle of the GNSS signal is calculated in Step 218 based on the difference between the actual 56 and nominal arrival angles 48 and the actual and nominal arrival phases of the GNSS signal. The relative signal offset for the platform is then determined in step 120.

Figure 8:
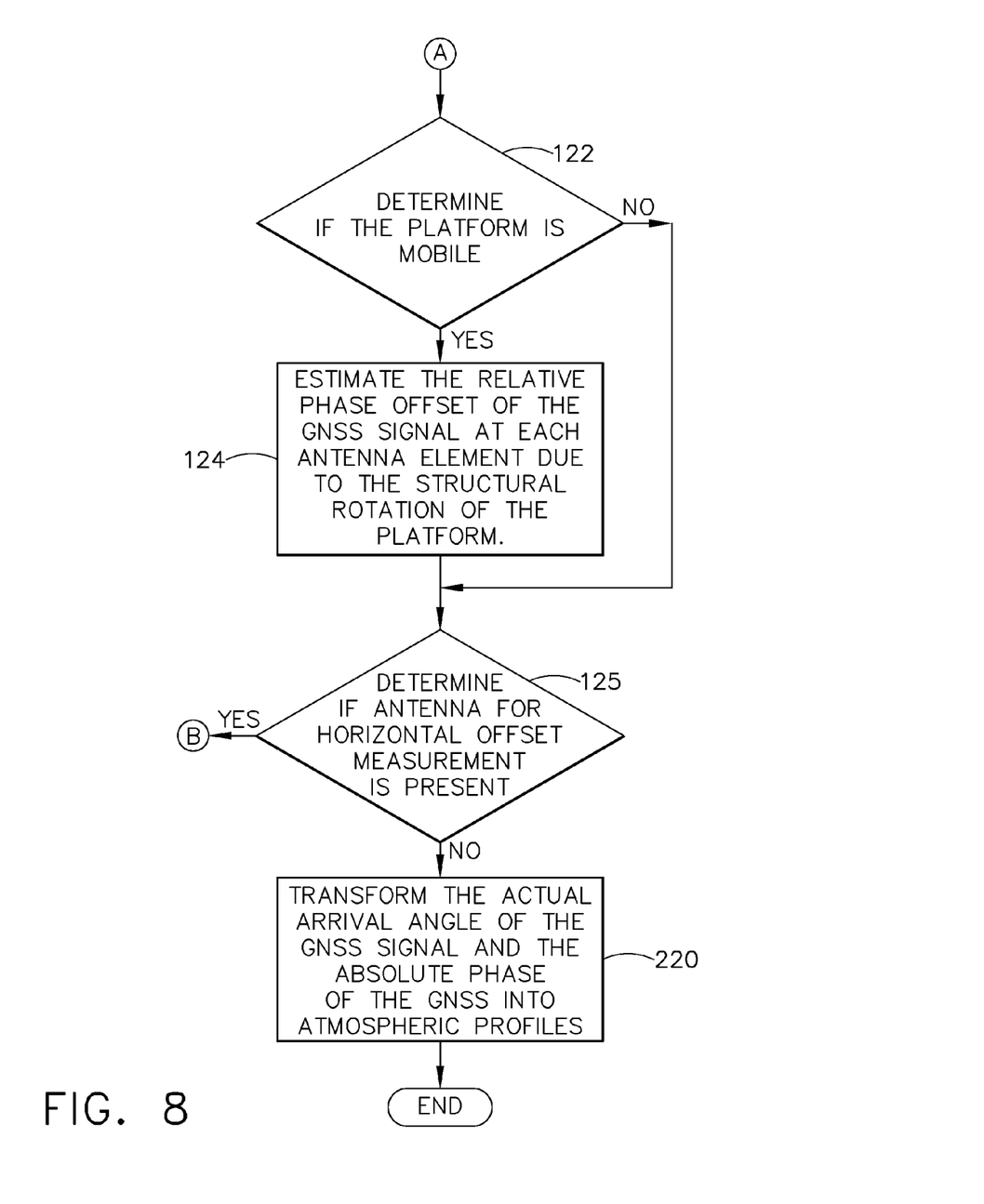

Referring now to FIG. 8, another embodiment of the present invention also compensates for motion or inaccuracies caused by mobile platforms. After the steps from either of FIG. 6 or 7 are completed, Step 122 of FIG. 8 determines if the platform, which the antenna elements are located on, is a mobile platform. If the platform is mobile, then the system proceeds in Step 124 to estimate the relative phase offset of the GNSS signal at each antenna element due to the structural rotation of the platform. If the platform is not mobile, the system proceeds directly to Step 125. In Step 125, the system determines whether a third antenna element is present. If a third antenna element is not present, then the system transforms the actual arrival angle of the GNSS signal and the absolute phase angle of the GNSS into atmospheric profiles in step 220. If a third antenna element is present, then the system moves on to further steps, which are discussed in FIG. 9 below.

Figure 9:
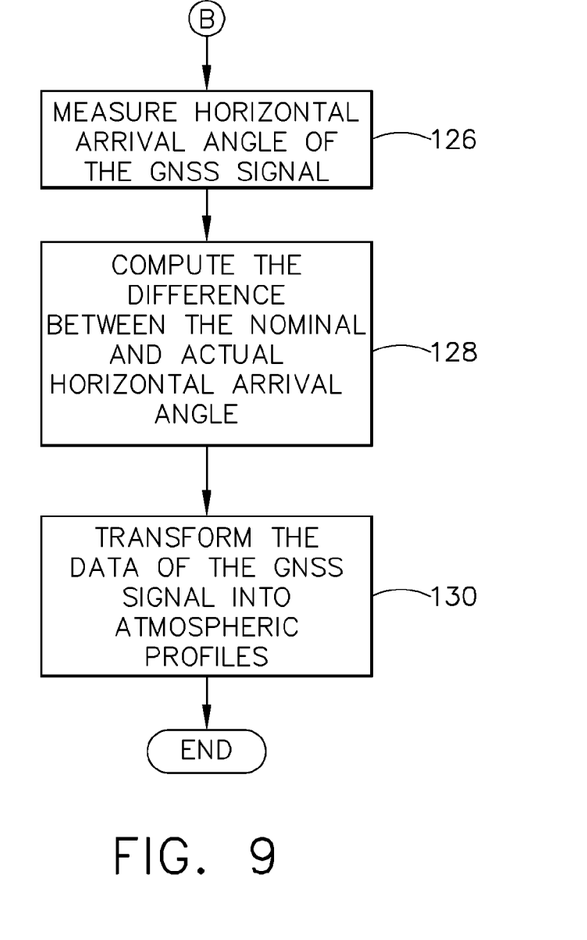

Referring to FIG. 9, measurement of the horizontal arrival angle as well as the vertical arrival angle and the absolute phase allows the present invention to estimate atmospheric variations that are horizontal and perpendicular to the GNSS path. Measurements of horizontal gradients are of great value to predictive weather models because they can be used to improve the accuracy of vertical profiles since estimated vertical profiles are not forced to fit a model that assumes horizontal homogeneity. This embodiment is easily achieved when using airplanes as platforms for mounting the antenna elements. Because airplanes have long wingspans and large fuselages, it is easy to achieve large horizontal separations of the antenna elements by placing them far apart on the airplane. This enables very precise measurements of horizontal arrival angles, and therefore good estimates of horizontal refractivity gradients. Once the system determines that a third antenna element is present in step 125, the system measures the horizontal arrival angle of the GNSS signal in Step 126. The difference between nominal and actual horizontal arrival angle of the GNSS path signal is calculated in Step 128, and then data is transformed into accurate atmospheric profiles in Step 130. Therefore, it is intended that the invention not be limited to the particular embodiment disclosed as the best mode contemplated for carrying out this invention, but that the invention will include all embodiments falling within the scope of the appended claims.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

What is claimed is:

1. A method of determining refractivity properties of the Earth's atmosphere comprising:
   providing a plurality of antenna elements configured to measure an actual arrival angle of a signal, the antenna elements separated by a predetermined vertical distance;
   providing a receiver device, the receiver device being coupled to each of the plurality of antenna elements and configured to compute a nominal arrival angle of the signal based on data transmitted from a source of the signal;
   receiving the signal at each of the plurality of antenna elements;
   measuring an actual arrival angle of the signal using the plurality of antenna elements;
   determining a difference between the nominal arrival angle of the signal and the actual arrival angle of the signal;
   calculating a refractive bending angle of the signal based on the determined difference between the actual and nominal arrival angles; and
   transforming the refractive bending angle of the signal into a profile of physical properties of the atmosphere.

2. The method of claim 1, wherein the step of transforming the refractive bending angle of the signal into a profile of physical properties of the atmosphere, includes:
   defining a vector, the vector including a plurality of values of atmospheric properties to be estimated, varying at least one of the values of the plurality of values in the vector, and minimizing a cost function given by the following equation:

$$J(x)=\tfrac{1}{2}(x-x_b)^T B^{-1}(x-x_b)+\tfrac{1}{2}(Hx-y_0)^T R^{-1}(Hx-y_0)$$

where:
   x=vector of atmospheric properties to be estimated;
   J(x)=Cost function to be minimized;
   T=Matrix transposition operator;
   $x_b$=prior estimate of x based on other models;
   B=Matrix of weights based on confidence in and covariance of various values in $x_b$;
   H=Forward model that transforms a given vector of atmospheric properties into a vector of quantities actually observed;
   R=Matrix of weighs based on confidence in and covariance of various values of Hx and $y_0$;
   $y_0$=vector of observations including one or more measurements of refractive bending angles.

3. The method of claim 1, wherein the plurality of antenna elements comprises at least one high-gain steerable dish antenna element.

4. The method of claim 3, wherein antenna elements are mounted on a mobile platform, and wherein the method also includes estimating a relative arrival angle offset due to structural flexing of the mobile platform at each of the plurality of antenna elements.

5. The method of claim 3, wherein the method also includes estimating a relative offset angle of the signal for each high-gain steerable dish antenna of the plurality of antenna.

6. The method of claim 1, wherein the plurality of antenna elements comprises a vertical phased array of two or more antenna elements.

7. The method of claim 6, wherein the method also includes estimating a relative phase offset due to structural flexing of the platform of the signal at each of the plurality of antenna elements.

8. The method of claim 7 wherein the method includes installing an inertial measurement unit proximate to each antenna element of the plurality of antenna elements, and measuring structural flexing of the platform.

9. The method of claim 8, wherein a plurality of inertial measurement units are configured to compensate for flexing or mobility of the mobile platform.

10. The method of claim 8, wherein the at least one inertial measurement unit is provided for each antenna element of the plurality of antenna elements, each inertial measurement unit being disposed proximately to the corresponding antenna element.

11. The method of claim 6, wherein the receiver is also configured to measure the phase difference between signals arriving at each of the plurality of antenna elements.

12. The method of claim 11, wherein the method also includes:
   providing an additional antenna element, the additional antenna element being horizontally separated from the plurality of antenna elements and connected to the receiver unit, the receiver unit also being configured to measure a horizontal angle of the signal; and
   estimating atmospheric variations that are horizontal and perpendicular to the path.

13. The method of claim 11, wherein the method includes providing at least one inertial measurement unit for estimating a relative phase shift between the antenna elements.

14. The method of claim 13, wherein the at least one inertial measurement unit includes a first inertial measurement unit configured to compensate for rotation and motion of the mobile platform.

15. The method of claim 1, wherein the signal is a global navigational satellite system or a communication system selected from the group consisting of: GPS, GLONASS Galileo, Iridium, Globalstart, Intermediate Circuilar Orbit, Orbcomm and Teledesic.

16. A method of determining refractivity properties of the Earth's atmosphere comprising:
   providing a plurality of antenna elements configured to measure an actual arrival angle and actual arrival phase of a signal, the antenna elements mounted on a platform and separated by a predetermined vertical distance;

providing a receiver device, the receiver device being coupled to each of the plurality of antenna elements and configured to calculate a nominal arrival angle and a nominal arrival phase of the signal based on data transmitted from a source of the signal;

receiving the signal at each of the plurality of antenna elements;

measuring an actual arrival angle of the signal;

measuring an actual arrival phase of the signal for each antenna element of the plurality of antenna elements;

determining a difference between the nominal arrival angle of the signal and the actual arrival angle of signal;

determining a difference between the nominal arrival phase of the signal and the actual arrival phase of signal;

calculating a refractive bending angle and an absolute phase shift of the signal based on the determined differences between the actual and nominal arrival angles of the signal and the actual and nominal arrival phases of the signal; and generating a profile of physical properties of the atmosphere based on a transformation of the refractive bending angle of the signal and the absolute phase shift of the signal.

17. The method of claim 15, wherein the step of generating a profile of physical properties of the atmosphere based on a transformation includes:

defining a vector, the vector including a plurality of values of atmospheric properties to be estimated, varying at least one of the values of the plurality of values in the vector, and minimizing a cost function given by the following equation:

$$J(x) = \tfrac{1}{2}(x-x_b)^T B^{-1}(x-x_b) + \tfrac{1}{2}(Hx-y_0)^T R^{-1}(Hx-y_0)$$

where:
x=vector of atmospheric properties to be estimated;
J(x)=Cost function to be minimized;
T=Matrix transposition operator;
$x_b$=prior estimate of x based on other models;
B=Matrix of weights based on confidence in and covariance of various values in $x_b$;
H=Forward model that transforms a given vector of atmospheric properties into a vector of quantities actually observed;
R=Matrix of weighs based on confidence in and covariance of various values of Hx and $y_0$;
$y_0$=vector of observations including one or more measurements of refractive bending angles and one or more measurements of absolute phase.

18. The method of claim 15 also comprising:
providing means for estimating a relative phase shift of the signal due to structural movement of the platform, for each of the plurality of antenna elements;
before calculating the refractive bending angle, computing a relative phase shift associated with structural motion; and
subtracting from the phase of the signal the relative phase shift.

19. A system for determining refractivity properties of the Earth's atmosphere comprising:
a plurality of antenna elements configured to measure the arrival angle of a signal, the plurality of antenna elements mounted on a platform and separated by a predetermined vertical distance;
a receiver unit, the receiver unit being coupled to each of the plurality of antenna elements;
wherein the receiver unit being configured to:
receive the signal detected by each of the plurality of antenna elements;
compute a nominal arrival angle of the signal based on data transmitted from a source of the signal;
measure an actual arrival phase of the signal for each antenna element of the plurality of antenna elements;
compute an actual arrival angle from the arrival phases;
determine a difference between the nominal arrival angle of the signal and the actual arrival angle of signal;
calculate a refractive bending angle of the signal based on the determined differences between the actual and nominal arrival angles of the signal; and
generate a profile of physical properties of the atmosphere based on a transformation of the refractive bending angle of the signal.

20. The system of claim 18, wherein the plurality of antenna elements comprises a vertical phased array of two or more antenna elements.

21. The system of claim 19, wherein the system also includes an additional antenna element, the additional antenna element being horizontally separated from the plurality of antenna elements and connected to a receiver unit, the receiver unit also being configured to measure a horizontal angle of the signal, wherein the additional antenna elements are used to compute atmospheric variations that are horizontal and perpendicular to a signal path.

22. The system of claim 18, wherein the plurality of antenna elements comprises at least one high-gain steerable dish antenna elements.

23. The system of claim 18, wherein the platform is a mobile platform, and the system also includes a means for estimating a relative phase shift of the signal due to structural movement of the platform, for each the plurality of antenna elements.

24. The system of claim 18, wherein the means for estimating a relative phase shift between the antenna elements comprises at least one inertial measurement unit.

25. The system of claim 23, wherein the at least one inertial measurement units includes a first inertial measurement unit configured to compensate for rotation and motion of the mobile platform, and additional inertial measurement units are configured to compensate for flexing or mobility of the mobile platform.

26. The system of claim 24, wherein the at least one inertial measurement unit is provided for each antenna element of the plurality of antenna elements, each inertial measurement unit being disposed proximately to the corresponding antenna element.

27. The system of claim 18 wherein the receiver unit is further configured to:
determine a difference between the nominal arrival phase of the signal and the actual arrival phase of the signal;
calculate an absolute phase shift of the signal based on the determined difference between the actual and nominal arrival phases of the signal; and
generate a profile of physical properties of the atmosphere based on a transformation of the refractive bending angle of the signal and the absolute phase shift of the signal.

28. The system of claim 17, wherein the signal is a global navigational satellite system or a communication system selected from the group consisting of: GPS, GLONASS Galileo, Iridium, Globalstart, Intermediate Circuilar Orbit, Orbcomm and Teledesic.

* * * * *